United States Patent
Elson et al.

(10) Patent No.: US 12,552,382 B2
(45) Date of Patent: Feb. 17, 2026

(54) METHOD AND SYSTEM FOR POWER MANAGEMENT IN A STANDALONE VEHICLE MONITORING DEVICE

(71) Applicant: CAMBRIDGE MOBILE TELEMATICS INC., Cambridge, MA (US)

(72) Inventors: Jeremy Elson, Cambridge, MA (US); David Jacobowitz, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 152 days.

(21) Appl. No.: 18/398,025

(22) Filed: Dec. 27, 2023

(65) Prior Publication Data
US 2025/0214586 A1    Jul. 3, 2025

(51) Int. Cl.
*B60W 30/18* (2012.01)
*B60L 53/51* (2019.01)

(52) U.S. Cl.
CPC ....... *B60W 30/18009* (2013.01); *B60L 53/51* (2019.02); *B60W 2554/4041* (2020.02)

(58) Field of Classification Search
CPC ..... B60W 30/18009; B60W 2554/4041; B60L 53/51; G06F 1/3215; G06F 1/3228; G06F 1/3243; G06F 1/3287; G06F 1/329; G06F 1/3212
See application file for complete search history.

(56) References Cited

U.S. PATENT DOCUMENTS

| | | | | |
|---|---|---|---|---|
| 12,141,012 | B2* | 11/2024 | Venkatesh | G06F 11/3058 |
| 2002/0091956 | A1* | 7/2002 | Potter | G06F 1/3215 |
| | | | | 713/324 |
| 2008/0087856 | A1* | 4/2008 | Wilson | E03D 5/105 |
| | | | | 4/313 |

(Continued)

FOREIGN PATENT DOCUMENTS

EP    3021289 A1    5/2016

OTHER PUBLICATIONS

EP24223077.9, "Extended European Search Report", Jun. 5, 2025, 11 pages.

*Primary Examiner* — Kurt Philip Liethen
(74) *Attorney, Agent, or Firm* — Kilpatrick Townsend & Stockton LLP

(57) ABSTRACT

A device positionable in a passenger compartment of a vehicle can include a processor, an accelerometer, and a wireless transmitter. The processor can receive, while in a hibernation mode, an interrupt signal from the accelerometer based on the accelerometer detecting an acceleration of the vehicle that exceeds a predefined acceleration threshold. In response to receiving the interrupt signal from the accelerometer, the processor can switch from the hibernation mode to a sleep mode. While in the sleep mode, the processor can detect a trip start event based on one or more accelerometer values from the accelerometer. In response to detecting the trip start event, the processor can then switch from the sleep mode to an active mode. While in the active mode, the processor can receive additional accelerometer values from the accelerometer and store them for subsequent transmission to a remote server system using the wireless transmitter.

21 Claims, 8 Drawing Sheets

(56) References Cited

U.S. PATENT DOCUMENTS

| | | | |
|---|---|---|---|
| 2009/0305819 A1* | 12/2009 | Denton | A63B 24/0021 |
| | | | 342/357.57 |
| 2013/0318382 A1* | 11/2013 | Yoshihara | G06F 1/3287 |
| | | | 713/323 |
| 2015/0049737 A1* | 2/2015 | Yang | H04W 36/30 |
| | | | 370/332 |
| 2015/0162996 A1* | 6/2015 | Thurfjell | H04B 17/12 |
| | | | 370/329 |
| 2016/0309537 A1* | 10/2016 | Hart | H04B 17/318 |
| 2017/0046025 A1* | 2/2017 | Dascola | G06F 3/0416 |
| 2021/0221312 A1 | 7/2021 | Jenkins et al. | |

* cited by examiner

METHOD AND SYSTEM FOR POWER MANAGEMENT IN A STANDALONE VEHICLE MONITORING DEVICE

BACKGROUND OF THE INVENTION

Systems that monitor a driver's behavior in a vehicle have become increasingly common. In some cases, these systems leverage the smart phone of the driver to detect and monitor their driving behavior. For example, these systems may utilize the smart phone's internal sensors, such as its Global Navigation Satellite System (GNSS) chipsets and accelerometers, to track speed, braking, and other driving behavior. In other cases, systems to monitor driving behavior may be physically integrated into the vehicle and capable of accessing the vehicle's on-board sensor data. In still other cases, standalone devices that are neither integrated into the vehicle nor a smart device of the user may be utilized to monitor driving behavior.

Despite the progress made in the area of vehicle monitoring, there is a need in the art for improved methods and systems related to monitoring driving behavior.

SUMMARY OF THE INVENTION

The present application generally relates to methods and systems for reducing the power consumption of standalone devices used to monitor driving behavior, to extend their battery life and, avoid operability problems that may otherwise arise from low power.

Some examples described herein can involve selectively switching a processor, a global navigation satellite system (GNSS), and/or another electronic component of the standalone device between power modes (e.g., off, a hibernation mode, a sleep mode, and an active mode) based on trip status, such as whether a trip in a vehicle has begun or ended. For example, the standalone device can maintain the processor in a hibernation mode and the GNSS in a completely off state until a trip is detected. This can reduce the power consumption of the standalone device when the vehicle is not in motion. The standalone device can detect the start of a trip using data from its accelerometer. In response to determining that a trip has begun, the standalone device can switch the processor and GNSS to their active modes, so that they can perform their intended functions. In their active modes, the processor and the GNSS can consume more battery power than in the lower power modes. If, at a later point in time, the standalone device determines that the trip has ended, the standalone device may revert the processor and the GNSS back to their hibernation mode and off state, respectively, to further reduce power consumption.

In some examples, the processor be automatically switched between three or more different power modes to reduce power consumption. For instance, the standalone device may automatically put the processor into hibernation mode by default when it detects that the vehicle is not in motion (e.g., stopped). In the hibernation mode, the processor may consume less power than in the sleep mode or active mode. For example, the processor may consume nanowatts (nW) of power in the hibernation mode, microwatts (μW) of power in the sleep mode, and milliwatts (mW) of power in the active mode. While the processor is in the hibernation mode, the standalone device's accelerometer can detect acceleration events, which may arise due to the vehicle starting to move, an impact to the vehicle, an earthquake, or another reason. The accelerometer can consume a very small amount of power, and therefore continued use of the accelerometer when the vehicle is not in motion may not significantly drain the battery. In response to detecting an acceleration event that exceeds a predefined acceleration threshold, the accelerometer can transmit an interrupt signal to the processor. In response to receiving the interrupt signal, the processor can switch from the hibernation mode into the sleep mode. While in the sleep mode, the processor can receive and analyze acceleration measurements (e.g., high-data-rate acceleration measurements) from the accelerometer to determine whether the interrupt signal was a result of a new trip for which recording is performed or an unrelated vibration or other noise that allows the processor to return to the hibernation state. If the processor determines that the interrupt signal resulted from a new trip, it may switch from its sleep mode to its active mode so that it can perform further operations. Conversely, if the processor determines that the interrupt signal resulted from an acceleration event other than the start of a trip, the processor may automatically revert back to hibernation mode. Using these techniques, the processor may substantially remain in lower power modes— e.g., hibernation mode and sleep mode-until it determines that a trip has started. This can reduce the power consumption of the processor and thereby elongate battery life (the length of time before the battery needs to be recharged).

In some examples, the standalone device can selectively transmit trip data to a remote server system depending on the charge level of the battery and other factors. For example, the standalone device can detect a triggering event, such as a trip ending, local storage space being below a predefined storage threshold, or a user request. The standalone device may detect that a trip ended by analyzing accelerometer data and other data, such as GNSS position information. The standalone device can also determine whether the battery level exceeds a predefined threshold, for example by analyzing battery voltage data and battery temperature data. Based on detecting the triggering event and determining that the battery level exceeds the predefined threshold, the standalone device can operate an onboard wireless transmitter to attempt to wirelessly transmit the trip data to the server system. By waiting until a triggering event occurs to transmit the trip data to the server system, for example rather than transmitting the trip data in real time, the number of transmissions can be reduced. This can conserve bandwidth and battery life, because the wireless transmitter can consume a significant amount of power with each transmission. Additionally, by confirming that the battery has at least the threshold amount of power before operating the wireless transmitter, the standalone device can avoid attempting to operate the wireless transmitter when there would be insufficient battery power to do so. If the attempted transmission fails, or if the wireless transmission conditions are unfavorable (e.g., there is a weak signal), or if the standalone device decides to save energy by not attempting to transmit the trip data, the standalone device can try to transmit the trip data again at a later point in time. For example, the standalone device can try to transmit the trip data to the server system after the next trip has begun. Waiting until after the next trip has begun may make the transmission more likely to be successful, because it is more likely that the vehicle is on the road (e.g., as opposed to parked in a garage, underground, or in another location that may interfere with the wireless transmission).

In some examples, the standalone device can include a solar panel usable to charge the battery. The solar panel can be used additionally or alternatively to normal charging sources (e.g., a USB charging port). The solar panel can be positioned on the standalone device to receive sunlight through a windshield of the vehicle, when the standalone device is positioned in a passenger compartment of the vehicle. For example, the standalone device can be configured to attach to the windshield of the vehicle and the solar panel can be positioned on the standalone device to sit adjacent to the windshield and receive sunlight through the windshield. As another example, the standalone device can be configured to attach to the dashboard of the vehicle or to another part of the passenger compartment of the vehicle, and the solar panel can be positioned on the standalone device to receive sunlight through the windshield and/or other windows of the vehicle. The solar panel can allow the standalone device to be charged any time there is sunlight, such as while the vehicle is engaged in a trip or parked during the day at an outdoor location, to help extend the battery life of the standalone device.

The standalone device can also implement other techniques to reduce power consumption. For example, the standalone device can continuously monitor the battery's charge level (e.g., state of charge) and classify the battery's charge level at any given point in time into one of four categories, such as full, partial, low, or critical. Each category may correspond to a different range of battery levels. Depending on the category associated with the battery's charge level at a given point in time, the standalone device may enable or disable certain functionality. For instance, when the battery's charge level falls into the first or second category, the standalone device may perform a first set of functions. Examples of such functions can include recording trip data, transmitting the trip data using the wireless transmitter, operating a battery status LED, and monitoring the solar panel. When the battery's charge level falls into the third category, the standalone device may perform a second set of functions, which consists of fewer functions than the first set of functions. For example, the standalone device may record trip data, operate the battery status LED, and monitor the solar panel, but it may not transmit the trip data using the wireless transmitter (because the wireless transmitter can consume a large amount of power). When the battery's charge level falls into the fourth category, the standalone device may perform a third set of functions, which consists of fewer functions than the second set of functions. For example, the standalone device may operate the battery status LED and monitor the solar panel, but it may not record and transmit trip data. This process can increase the reliability of the standalone device by selectively reducing its enabled functionality to the most essential functions when conditions require it, which can help maintain the device's basic functionality, avoid damaging the battery, avoid crashes and lockups, etc.

One example of the present disclosure includes an apparatus comprising an outer housing removably positionable in a passenger compartment of a vehicle, the outer housing including. The apparatus also comprises a battery, a wireless transmitter coupled to the battery, and an accelerometer coupled to the battery. The accelerometer can be configured to transmit an interrupt signal in response to detecting an acceleration of the vehicle that exceeds a predefined acceleration threshold. The apparatus further comprises a processor coupled to the battery, the accelerometer, and the wireless transmitter. The processor is configured to: while in a hibernation mode, receive the interrupt signal from the accelerometer. The processor is also configured to, in response to receiving the interrupt signal from the accelerometer, switch from the hibernation mode to a sleep mode. The processor is also configured to, while in the sleep mode, detect a trip start event based on one or more accelerometer values from the accelerometer, the trip start event being indicative of a start of a trip in the vehicle. The processor is also configured to, in response to detecting the trip start event, switch from the sleep mode to an active mode. The processor is also configured to, while in the active mode, receive additional accelerometer values from the accelerometer and store the additional accelerometer values as trip data for subsequent transmission to a remote server system using the wireless transmitter. The apparatus also comprises a solar panel configured to generate electrical power to charge the battery.

Another example of the present disclosure includes a method comprising transmitting, by an accelerometer of a device positioned in a passenger compartment of a vehicle, an interrupt signal to a processor of the device in response to detecting an acceleration of the vehicle that exceeds a predefined acceleration threshold. The method also involves receiving, by the processor while in a hibernation mode, the interrupt signal from the accelerometer. The method also involves switching, by the processor, from the hibernation mode to a sleep mode in response to receiving the interrupt signal from the accelerometer. The method also involves while in the sleep mode, detecting, by the processor, a trip start event based on one or more accelerometer values from the accelerometer, the trip start event being indicative of a start of a trip in the vehicle. The method also involves switching, by the processor, from the sleep mode to an active mode in response to detecting the trip start event. The method also involves, while in the active mode, receiving, by the processor, additional accelerometer values from the accelerometer and store the additional accelerometer values as trip data for subsequent transmission to a remote server system using a wireless transmitter.

Still another example of the present disclosure includes a non-transitory computer-readable medium comprising program code that is executable by a processor of a device that is positionable in a passenger compartment of a vehicle, the program code being executable by the processor to perform operations. The operations can include receiving, while in a hibernation mode, an interrupt signal from an accelerometer of the device, the accelerometer being configured to generate the interrupt signal in response to detecting an acceleration of the vehicle that exceeds a predefined acceleration threshold. The operations can include switching from the hibernation mode to a sleep mode in response to receiving the interrupt signal from the accelerometer. The operations can include, while in the sleep mode, detecting a trip start event based on one or more accelerometer values from the accelerometer, the trip start event being indicative of a start of a trip in the vehicle. The operations can include switching from the sleep mode to an active mode in response to detecting the trip start event. The operations can include, while in the active mode, receiving additional accelerometer values from the accelerometer and store the additional accelerometer values as trip data for subsequent transmission to a remote server system using a wireless transmitter.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein.

rather, these embodiments are provided by way of illustration only and so that this disclosure will be thorough, complete, and will fully convey the full scope to those skilled in the art.

DETAILED DESCRIPTION OF SPECIFIC EMBODIMENTS

The present application generally relates to methods and systems for reducing the power consumption of standalone devices used to monitor driving behavior, which can extend their battery life and avoid operability problems that may otherwise arise from low power.

Because smart phones and other smart devices of the driver may be regularly charged (e.g., nightly) in their normal course of use, these devices typically have sufficient battery power to perform their monitoring functions. Integrated monitoring systems in a vehicle also typically have sufficient power, because they are plugged into the vehicle and receive power from the vehicle's on-board battery. Standalone devices, however, may be left in the vehicle for extended lengths of time and their battery may be infrequently charged. Because such standalone devices are infrequently charged, embodiments of the present disclosure provide systems and methods for reducing the power consumption of these devices to extend their battery life.

Figure 1:
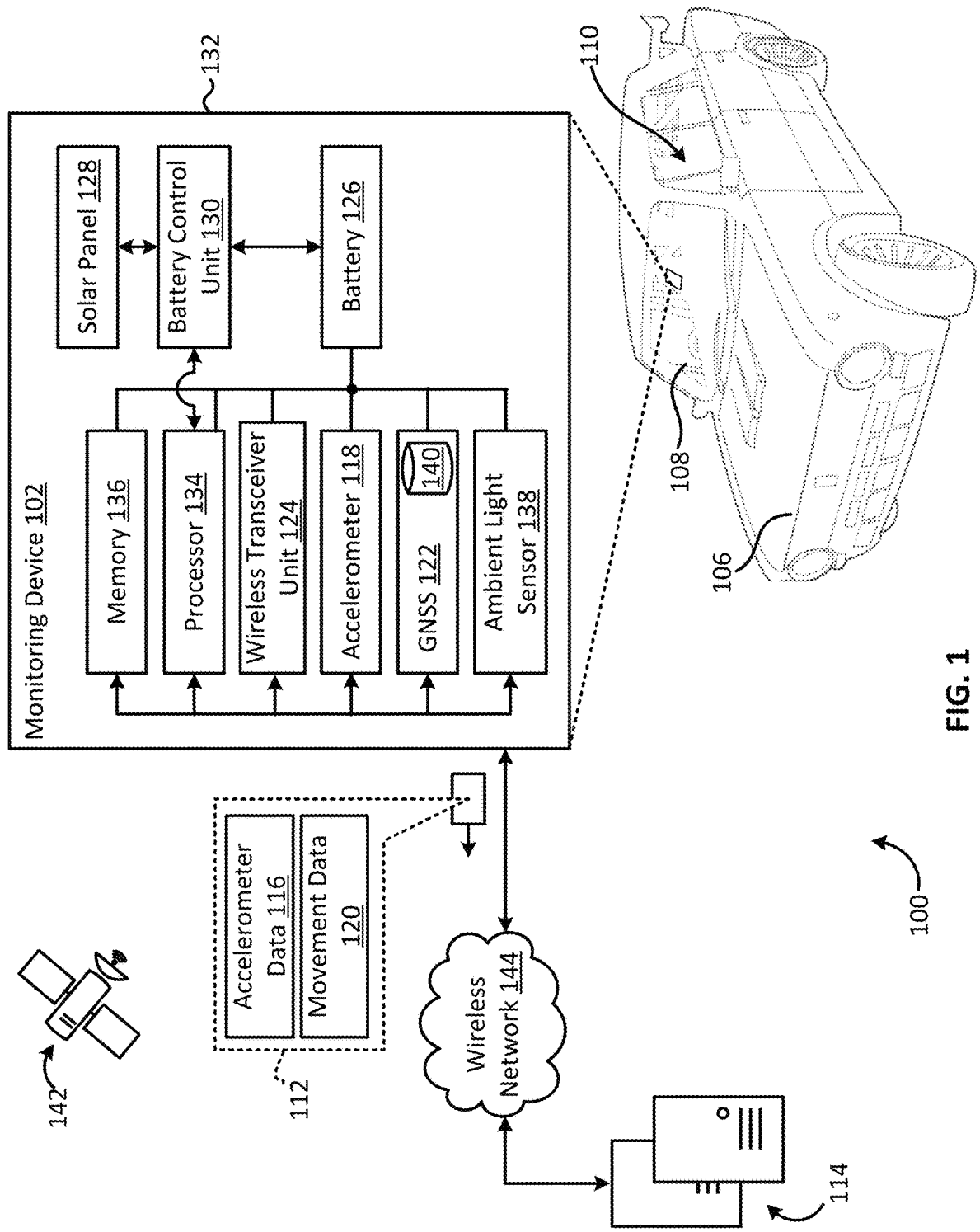
FIG. 1 shows a block diagram of an example of a system for reducing power consumption of a monitoring device, according to some aspects of the present disclosure.

FIG. 1 shows a block diagram of an example of a system 100 for reducing power consumption of a monitoring device 102 according to some aspects of the present disclosure. The monitoring device 102 is configured to monitor driver behavior. The monitoring device 102 can be positioned in the passenger compartment 110 of a vehicle 106. For example, the monitoring device 102 can be coupled to the interior face of a windshield 108 of the vehicle 106. The monitoring device 102 can be coupled to the windshield 108 or another part of the vehicle 106 using any suitable mechanism, such as an adhesive or a hook-and-loop fastening system. The coupling may be removable to allow the user to manually attach and detach the monitoring device 102 with relative ease.

While positioned in the vehicle 106, the monitoring device 102 can collect trip data 112 related to the behavior of a driver during a trip in the vehicle 106. The trip data 112 can include any suitable information. For example, the trip data 112 may include accelerometer data 116 collected by one or more accelerometers 118 (e.g., multi-axis accelerometers). The trip data 112 can also include movement data 120 collected by a global navigation satellite system (GNSS) 122, such as a Global Positioning System unit. Examples of the movement data 120 can include location, speed, and directional data. The trip data 112 may further include rate-of-turn data and orientation data from one or more gyroscopes of the monitoring device 102. The trip data 112 can also include information about the driver's identity and/or a passenger's identity, which may be determined based on wireless signals received from nearby user devices (e.g., mobile phones of the driver and passenger). The trip data 112 may also include data that might indicate deployment of air bags, including air pressure data from an air pressure sensor of the monitoring device 102 or audio sensor data from a microphone of the monitoring device 102. The trip data 112 may additionally or alternatively include other information, such as driver alertness data (e.g., head dip data), eye tracking data, driver hand position data, one or more parameters provided by the vehicle via its on-board diagnostic system or otherwise, etc.

After collecting the trip data 112, the monitoring device 102 can transmit the trip data 112 to a remote server system 114 via one or more wireless networks 144, such as a cellular network. The monitoring device 102 can operate a wireless transceiver unit 124 to transmit the trip data 112. The wireless transceiver unit 124 can include one or more wireless transmitters and/or receivers, such as wireless modems (e.g., a LTE CAT-MI modem or NB-IOT modem) and radios. The server system 114 can receive and analyze the trip data 112, for example to perform crash detection, determine the reason for an accident, or derive other insights.

In some examples, the monitoring device 102 may operate solely by using power from an internal battery 126. In those situations, the monitoring device 102 may not be connected to the vehicle's battery or any other battery during its normal course of use. The internal components of the monitoring device 102 can be configured to receive power from the battery 126. For example, some or all of the internal components can be coupled to the battery 126 to receive power therefrom. The battery 126 can be any suitable type of rechargeable battery, such as a lithium ion battery. In other examples, the monitoring device 102 can be connected to the vehicle's battery. For instance, the monitoring device 102 can have a power cable that is plugged into a power port of the vehicle. In those situations, the monitoring device 102 may operate based on battery power from the vehicle's battery, from its internal battery 126, or both. Having both battery sources available may increase the reliability of the monitoring device 102.

To help charge the battery 126, the monitoring device 102 can include a solar panel 128. For example, the solar panel 128 may form part of the outer housing 132 of the monitoring device 102 or may be coupled to the outer housing 132 of the monitoring device 102. The solar panel 128 can be positioned on the monitoring device 102 to receive light (e.g., sunlight or ambient light, such as from lights of a parking structure) for use in charging the battery 126. For example, the solar panel 128 can be positioned on the monitoring device 102 such that the solar panel 128 is sandwiched between the windshield 108 and the outer housing 132 when the monitoring device 102 is coupled to the windshield 108, thereby allowing the solar panel 128 to receive light through the windshield 108. A battery control unit 130 can be coupled to the battery 126 to monitor various battery properties (e.g., voltage, current, temperature, and state of charge) and control the flow of power to and from the battery 126. In some examples, the battery control unit 130 can be coupled between the solar panel 128 and the battery 126 to monitor and control power flow from the solar panel 128 to the battery 126.

The monitoring device 102 can also include one or more processors, such as processor 134, coupled to one or more memories, such as memory 136. The processor 134 is hardware that can include one processing device or multiple processing devices. Examples of the processor 134 can include a Field-Programmable Gate Array (FPGA), an application-specific integrated circuit (ASIC), or a microprocessor. The processor 134 is configured to execute processor-executable instructions stored in the memory 136 to perform one or more processes described herein. The instructions may include processor-specific instructions generated by a compiler or an interpreter from code written in any suitable computer-programming language, such as C, C++, C#, Java, or Python.

The memory 136 is hardware that can include one memory device or multiple memory devices. The memory 136 can be volatile or non-volatile (it can retain stored information when powered off). Examples of the memory 136 include electrically erasable and programmable read-only memory (EEPROM), flash memory, or cache memory. At least some of the memory 136 includes a non-transitory computer-readable medium from which the processor 134 can read instructions. A computer-readable medium can include electronic, optical, magnetic, or other storage devices capable of providing the processor 134 with the instructions or other program code. Examples of a computer-readable mediums include magnetic disks, memory chips, ROM, random-access memory (RAM), an ASIC, a configured processor, and optical storage.

The monitoring device 102 can implement a number of techniques to help reduce power consumption and thus elongate its battery life. One such technique can involve switching the processor 134 between different power modes in response to detecting various events. For example, the monitoring device 102 can maintain the processor 134 in a very low power state called "hibernation mode" by default. In hibernation mode, the processor 134 is not running. The accelerometer 118 can be configured to sample at a relatively low rate, and signal the processor 134 in response to detecting any acceleration over a predefined acceleration threshold (e.g., 0.3 g). For example, in response to detecting an acceleration that meets or exceeds the predefined acceleration threshold, the accelerometer can transmit an interrupt signal to the processor 134. The interrupt signal can cause the processor 134 to enter a "sleep mode." The sleep mode can consume more power than the hibernation mode. While in the sleep mode, the processor 134 can begin to receive and analyze accelerometer values from the accelerometer 118. For example, the processor 134 can query the accelerometer for 110 Hz or 400 Hz time-series data and apply an intelligent algorithm to differentiate motion due to vehicle operation (e.g., the start of a trip) from unrelated motion, such as an earthquake, a truck driving by, or an impact from an object. If the processor 134 detects vehicle operation based on the accelerometer data, the processor 134 can enter an active mode. The active mode can be the highest power mode in which the processor 134 executes all of the tasks for recording trip data 112. In this high power mode, the processor 134 can activate some or all other high-energy-consumption sensors and data collection peripherals that generate data the trip data 112 relevant to a trip (e.g. a GNSS recording position and speed data, rate-of-turn data from a gyroscope, air pressure data from a barometer of the monitoring device 102, and audio data from a microphone of the monitoring device 102). During a trip, the processor 134 can continue to receive accelerometer values (e.g., accelerometer measurements) from the accelerometer 118 and store them in memory 136. The processor 134 can also continue to analyze the accelerometer values for trip signals. A trip signal can be accelerometer data 116 and/or movement data 120 indicating that a trip is ongoing. If the processor 134 does not detect any trip signals for a predefined period of time (e.g., 10 minutes), the processor can reenter the sleep mode, and eventually the hibernation mode. Through this process, the monitoring device 102 can gradually progress the processor 134 through various power modes, in an effort to reduce its power consumption.

In some examples, the processor 134 may employ additional techniques to reduce its power consumption, even in the active mode. For instance, the processor 134 can enter a paused state as frequently as possible to aggressively save power. When the processor 134 is in the paused state, the processor 134 is no longer executing instructions and its high-speed clocks are halted, so it can only be awakened by interrupts generated from sources external to the processor 134. Examples of such the external sources can include peripherals, such as the accelerometer 118 or the wireless transceiver unit 124, which can generate interrupts to wake up the processor 134. Other examples of the external sources can include low-speed clocks. Unlike high-speed clocks that consume a great detail of power and may run in the Megahertz (MHz) range, low speed clocks use little power and may run in the Kilohertz (KHz) range. In some examples, the monitoring device 102 can include at least two low-speed clocks. The first low-speed clock can be used for periodic wakeup, allowing the processor 134 to do housekeeping at a low duty cycle. The periodic timer can wake the device at a periodic interval, such as every second, during which the processor 134 can do housekeeping tasks for a few milliseconds. The second low-speed clock can be used for tasks scheduled for some point in the future. Any software on the processor 134 can schedule a task to run at a future point in time. The processor's 134 task queue can find the earliest such deadline, ensure that the deadlines do not undermine power savings by coming too close together, and then schedule a single wakeup signal (e.g., in a one-shot timer) that serves as another interrupt source. By keeping the processor 134 paused for as much time as possible, and only waking the processor 134 in response to interrupt signals from peripherals or low-speed clocks, the power consumption of the processor 134 can be minimized.

In addition to reducing the power consumption of the processor 134, the monitoring device 102 can also implement measures to reduce the power consumption of other components, such as the GNSS 122. The GNSS 122 may generate movement data 120 (e.g., location data, speed data, and directional data) by receiving data from the U.S. Global Positioning System (GPS), the Russian GLONASS system, the European Galileo system, the Chinese BeiDou system, the Japanese QZSS system, etc. For instance, the GNSS 122 can generate movement data 120 by communicating with a satellite system 142. In some examples, the movement data 120 can include location data that indicates the current geographical location of the monitoring device 102, such as its latitude and longitude coordinates. The GNSS 122 may consume a considerable amount of power to operate, so it may be beneficial to keep the GNSS 122 powered off or in a sleep mode for as long as possible. To that end, the processor 134 can maintain the GNSS in an "off" state (powered off) at least until the processor 134 enters its active mode in response to detecting a trip. Alternatively, the processor 134 can leave the GNSS 122 in an "on state," but not record any of its measurements, at least until the processor 134 enters its active mode. This may avoid some of the power consumption associated with using the GNSS 122. Based on the processor 134 entering its active mode, the processor 134 can transmit a signal to turn on the GNSS 122. Once turned on, the GNSS 122 can be in an active mode. In the active mode, the GNSS 122 can generate movement data 120 and transmit it to the processor 134, which can store the movement data 120 in memory 136. As noted above, when the processor 134 is in its active state, it can monitor accelerometer data 116 for trip signals. If no trip signals are detected by the processor 134 for predefined duration (e.g., 10 seconds), the processor 134 can put the GNSS 122 into sleep mode. In the sleep mode, the GNSS 122 can use significantly less power than in its fully active mode, but its location state can still be maintained (e.g., in datastore 140) so that it can relock its geographical position quickly when reawakened. If the processor 134 does not detect a trip signal for another predefined time period while the GNSS 122 is in sleep mode, the processor 134 can turn off the GNSS 122 completely. On the other hand, if the processor 134 detects a trip signal while the GNSS 122 is in sleep mode, the processor 134 can awaken the GNSS 122 from sleep mode back into its active mode. By intelligently and selectively controlling the power mode (e.g., on, off, or sleep) of the GNSS 122 in this way, the monitoring device 102 can conserve battery power.

Because the GNSS 122 may be activated when a trip begins, it may be important for the GNSS 122 to acquire a location lock quickly. The GNSS 122 is more likely to acquire a location lock quickly if it has recently acquired a lock, giving it a good recent estimate of its position and time. Therefore, if the monitoring device 102 has not acquired a lock recently, it can periodically attempt to acquire a GNSS 122 lock at a predesignated interval, thereby keeping the GNSS 122 ready for the next time trip recording is needed.

To reduce the energy consumed by the location lock process, in some examples the processor 134 may only attempt a location lock if certain conditions are satisfied. One such condition may be that the periodic time interval (e.g., 12 hours) has elapsed. Another condition may be that at least a threshold amount of ambient light is detected using an ambient light sensor 138. The ambient light sensor 138 may be integrated into the solar panel 128 or may be separate from the solar panel 128. If insufficient light is detected, it may mean that the vehicle 106 is parked indoors, where a lock is likely to fail. This heuristic can keep the monitoring device 102 from needlessly wasting energy on attempting to acquire a GNSS 122 lock at a time that it is not likely to succeed. Yet another condition may be that the battery level meets or exceeds a predefined charge threshold. The predefined charge threshold can be a charge level that is greater than the amount of power needed by the GNSS 122 to perform the location lock. If some or all of these conditions are satisfied, the processor 134 can activate the GNSS 122, so that it can attempt the location lock. If the location lock is successful, the GNSS 122 can store the corresponding location state data in the datastore 140. If one or more of the above conditions are not satisfied, the processor 134 may skip the current location lock attempt and try again the next time the periodic time interval elapses.

Over the course of a trip, the monitoring device 102 can collect trip data 112. The trip data 112 can include the accelerometer data 116 (e.g., accelerometer values associated with the vehicle over the course of the trip), the movement data 120 (e.g., locations, speeds, and directions of travel associated with the vehicle over the course of the trip), driver alertness data, eye tracking data, drive hand position data, parameters supplied from the vehicle, or any combination thereof. The monitoring device 102 can be configured to attempt to transmit the trip data 112 to the server system 114 in response to one or more triggering events. Examples of the triggering events can include the end of the trip, the amount of available space in the memory 136 falling below a predefined memory threshold, or a user request (e.g., by pushing a button or other user interface interaction). By only attempting to transmit the trip data 112 in response to such triggering events, the wireless transceiver unit 124 is operated less frequently which can reduce bandwidth and battery consumption.

If the processor 134 detects a triggering event, the processor 134 can next determine whether the battery 126 has at least a predefined level of charge, which can be greater than the amount of power needed by the wireless transceiver unit 124 to attempt the transmission. If not, the transmission may be delayed until the battery 126 has at least the predefined level of charge. If so, the processor 134 can next evaluate the link conditions, such as the wireless signal strength. If the link conditions are favorable, for example because the wireless signal strength meets or exceeds a predefined strength threshold, the processor 134 can attempt to transmit the trip data 112 to the server system 114. If the link conditions are unfavorable, for example because the wireless signal strength is below the predefined strength threshold, or if the wireless transmission fails, the processor 134 can try to transmit the trip data 112 again later. For example, the processor 134 can try to transmit the trip data 112 again after detecting the start of a subsequent trip. Because the transmission failure may have occurred due to the vehicle's location (e.g., it being parked underground or indoors), waiting until the next trip begins to try to retransmit the trip data 112 may improve the likelihood of success.

The monitoring device 102 can be constructed as a standalone, hand holdable, portable device designed to be easily positioned in the passenger compartment of the vehicle 106, without having to be plugged into the vehicle 106 or otherwise electrically or communicatively coupled to the vehicle 106. The monitoring device 102 is primarily designed to monitor driving behavior and, thus, may not be capable of engaging in telephone calls or performing other functions, like smart phones or wearable devices (e.g., smart watches). Similarly, the monitoring device 102 may exclude cameras, microphones, and other components commonly found in cellular telephones.

Figure 2:
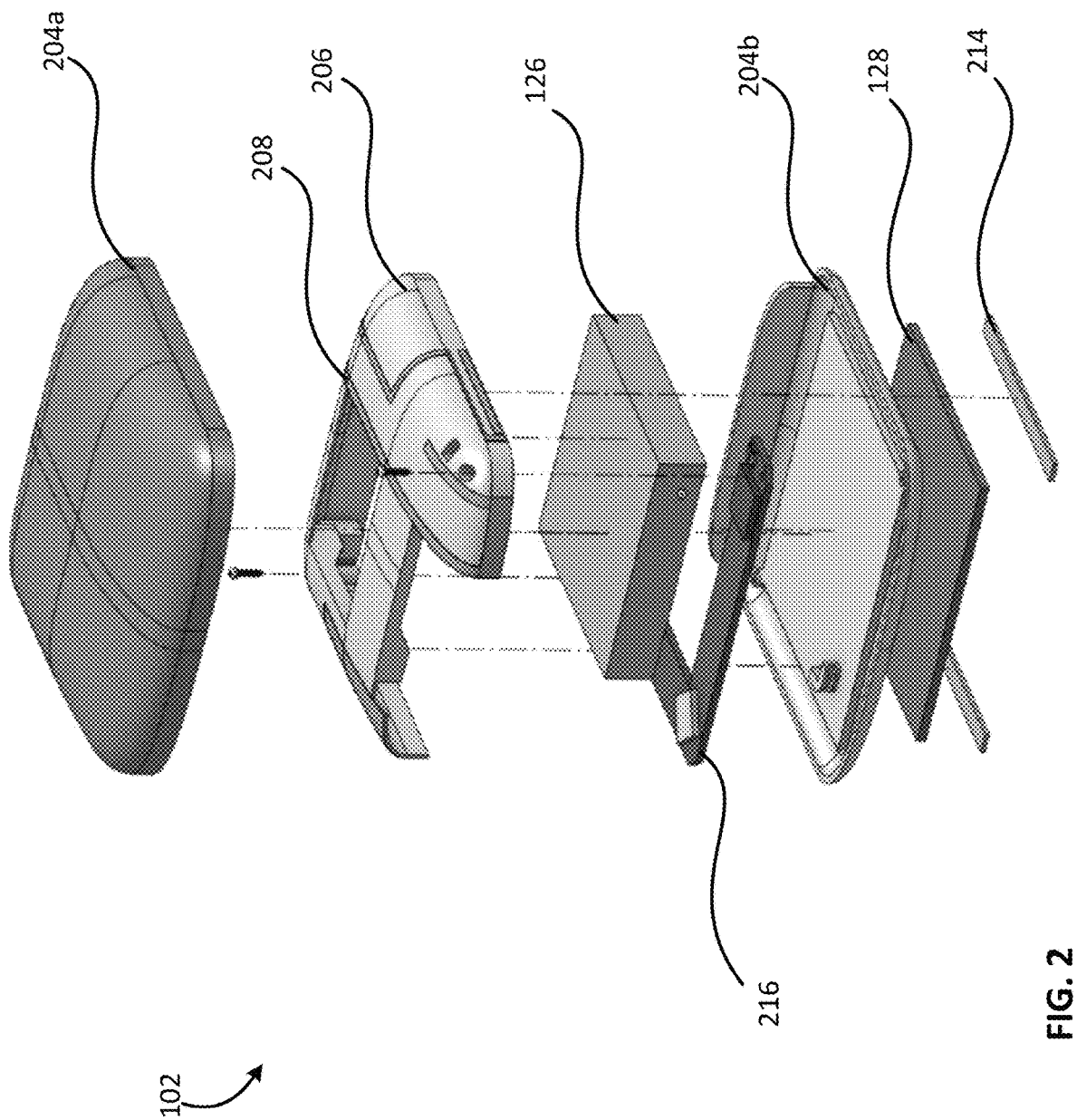
FIG. 2 shows an exploded view of an example of a monitoring device, according to some aspects of the present disclosure.

One example of an exploded view of the monitoring device 102 is shown in FIG. 2. As shown, the monitoring device 102 can include an outer housing 204 formed from an upper cover 204a and a lower cover 204b. The outer housing 204 can include any suitable material, such as plastic or rubber. Within the outer housing 104, the monitoring device 102 can include an antenna layer 206 with one or more antennas 208 of the wireless transceiver unit. The monitoring device 102 can also include a battery 126 and one or more printed circuit boards 216. The one or more printed circuit boards 216 can include the processor, memory, wireless transceiver unit (e.g., wireless modem and radios), accelerometer, GNSS, and/or other electronic components to facilitate any of the functionality described herein. A solar panel 128 can be disposed on the outer housing 204a, such as on the lower cover 204b, so that it is positioned to sit against the windshield when the monitoring device 102 is affixed to the windshield. The monitoring device 102 can be affixed to the windshield or another component of the vehicle by attachment devices 214, which may include adhesive strips, hook-and-loop fasteners, suction cups, etc. As described above, the monitoring device 102 can be designed to implement a variety of power saving processes to reduce the power consumption of the monitoring device 102. Some examples of those power saving processes, and other processes, will now be described with respect to FIGS. 3-8.

Figure 3:
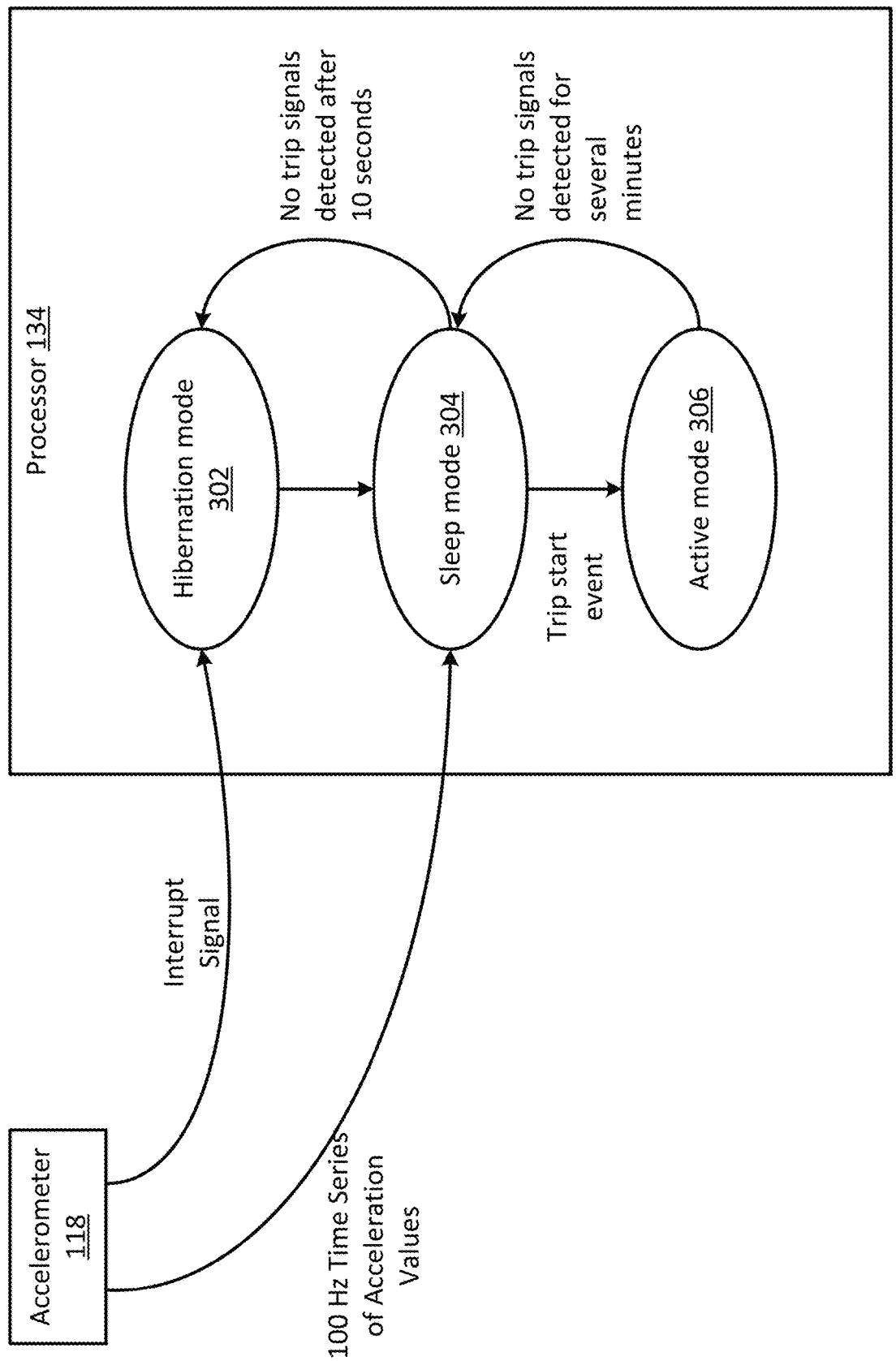
FIG. 3 shows an example of a process for switching among power modes of a processor, according to some aspects of the present disclosure.

Referring now to FIG. 3, shown is an example of a process for switching among power modes of a processor according to some aspects of the present disclosure. In this example, the processor 134 begins in a hibernation mode 302. If the accelerometer 118 detects an acceleration event that exceeds a predefined acceleration threshold (e.g., 0.3 g), the accelerometer 118 transmits an interrupt signal to the processor 134, which causes the processor 134 to enter the sleep mode 304. In other examples, another device can transmit the interrupt signal to the processor 134 to cause the processor to enter the sleep mode 304. While in the sleep mode 304, the processor 134 may receive accelerometer values from the accelerometer at a relatively low frequency, such as 100 Hz. The processor 134 can analyze the accelerometer values to determine whether they indicate that a trip has started. This analysis can be performed using one or more intelligent algorithms designed to distinguish between a trip start event and other types of acceleration events. For example, the intelligent algorithms may detect a trip start event based on the accelerometer data indicating a progressively increasing or steady rate of acceleration over the course of a predefined time period (e.g., 10 seconds), which may be consistent with the movement of a vehicle from a parked position and differentiable from an impulse events or vibrations associated with an impact or earthquake. If a trip start event is detected, the processor 134 can awaken to its active mode 306, at which point it can begin its trip recording routine. The trip recording routine can involve collecting data from the GNSS and collecting acceleration values from the accelerometer 118. In some examples, the acceleration values can be collected by the processor 134 at a higher frequency when executing the trip recording routine than when the processor 134 is in the sleep mode 304.

While executing the trip recording routine, the processor 134 can analyze the acceleration values to detect trip signals. A trip signal can be an indicator that a vehicle trip is ongoing. An example of a trip signal can be movement of the vehicle between two locations that are at least one foot (0.3 meters) apart, as determined based on location data collected by the GNSS. Another example of a trip signal can include the receipt of non-zero acceleration values for a predetermined time period, such as 10 seconds. The processor 134 can detect these and/or other trip signals by analyzing the incoming acceleration data and location data.

If the processor 134 does not detect at least one trip signal for at least a predefined time period, such as two minutes, the processor 134 may automatically switch from the active mode 306 back to the sleep mode 304. This may help conserve energy when the vehicle is stopped for relatively short time periods, such as when the vehicle is parked at a gas station or stopped at a red light. While in the sleep mode 304, the process may repeat, with the processor 134 waking to the active mode in response to detecting a trip signal again based on additional accelerometer data. Alternatively, if after it has entered the sleep mode, the processor 134 does not detect at least one trip signal within another predefined time period (e.g., 10 seconds), the processor 134 can return back to hibernation mode 302 and the process can start again from the beginning.

Figure 4:
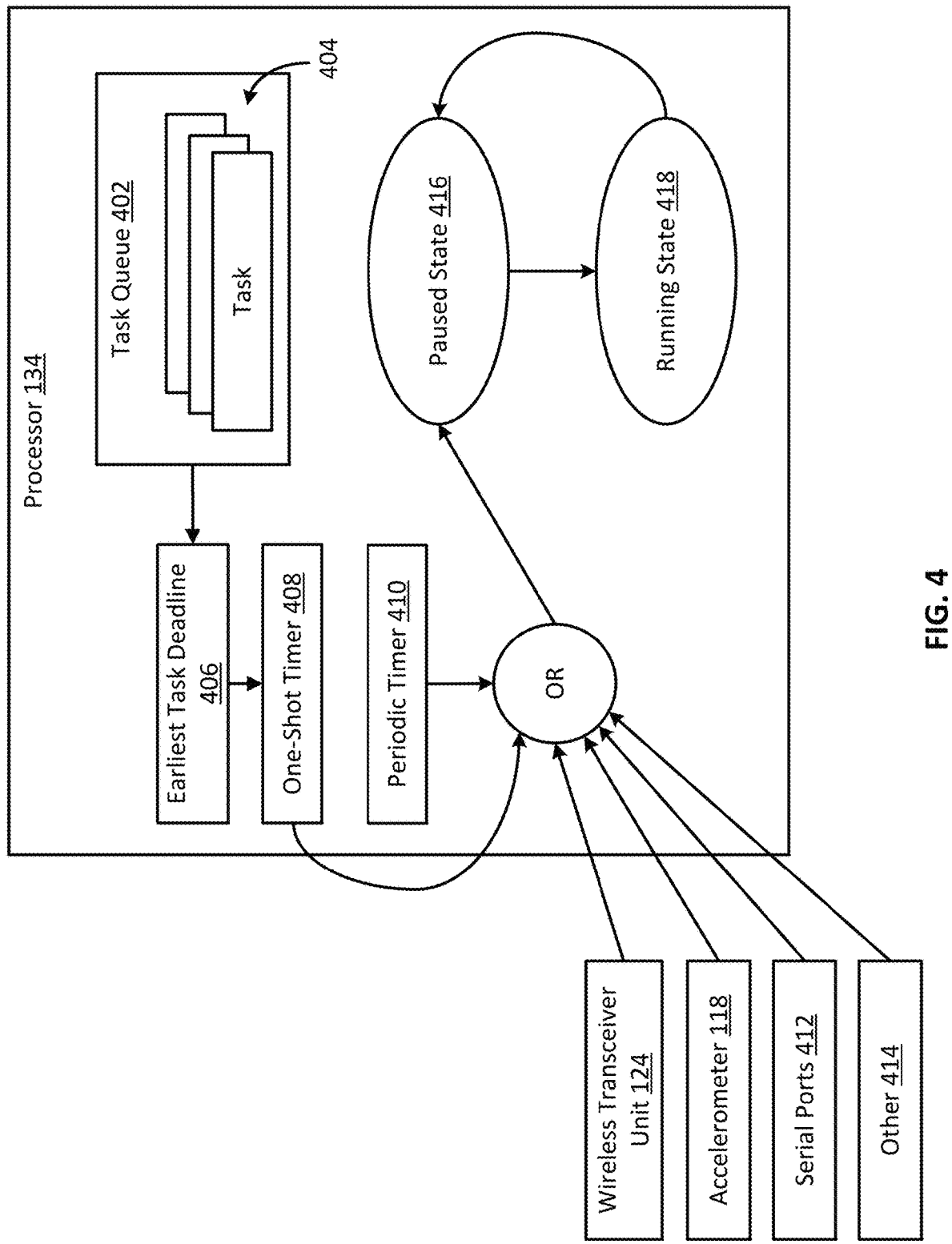
FIG. 4 shows an example of a process for pausing a processor between tasks, according to some aspects of the present disclosure.

Another way to reduce power consumption is by pausing the processor 134 as much as possible, even while it is in its active mode. FIG. 4 shows one example of such a process for pausing the processor 134. As shown, the processor 134 can automatically switch between a paused state 416 and a running state 418. When in the paused state 416, the processor 134 can keep all of its internal high-speed clocks halted and pause the execution of instructions. When in the running state 418, the processor 134 can operate its high-speed clocks and execute instructions. It may be desirable for the processor 134 to remain in the paused state 416 as much as possible to minimize power consumption. To that end, the processor 134 may automatically switch from the running state 418 to the paused state 416 between tasks scheduled in a task queue 402, because that interim time period generally constitutes dead time in which the processor 134 would simply be consuming power without engaging in any meaningful activity.

More specifically, the processor 134 can schedule any number of tasks 404 in a task queue 402 for future execution. Each of the tasks 404 may be scheduled with a time deadline by which the task is to be executed. The processor 134 can analyze the task deadlines for the tasks 404 scheduled in the task queue 402, determine the earliest task deadline 406 (e.g., the nearest task deadline to the current time) among the task deadlines, and schedule a wakeup signal at the earliest task deadline 406 in a one-shot timer 408 that serves as an interrupt source. The one-shot timer 408 can be communicatively coupled to the processor 134. When the one-shot timer 408 determines that the current time is the same as the earliest task deadline 406, the one-shot timer 408 can automatically transmit an interrupt signal to the processor 134 that switches the processor 134 from its paused state 416 back to its running state 418. The processor 134 can then execute the scheduled task and remove it from the task queue 402. The process can then repeat for the next earliest deadline time in the task queue 402, and so on, so that the processor 134 is put to sleep between each task execution and awoken at the appropriate times to execute the tasks.

In some examples, the monitoring device can include additional interrupt sources that can transmit interrupt signals for switching the processor 134 from the paused state 416 to the running state 418. Examples of such additional interrupt sources can include a periodic timer 410 that is configured to wake the processor 134 at a predefined periodic interval (e.g., to allow the processor 134 to perform housekeeping tasks at a low duty cycle), the wireless transceiver unit 124 that is configured to transmit received data (e.g., data arriving via Bluetooth, 802.11, and/or cellular protocols) to the processor 134, the accelerometer 118 that is configured to transmit new acceleration data to the processor 134, one or more serial ports 412 for engaging in serial communications, and/or other interrupt sources 414. Any of these interrupt sources may transmit interrupt signals to awaken the processor 134 from its paused state 416 so that the processor 134 can perform any necessary corresponding functionality.

Figure 5:
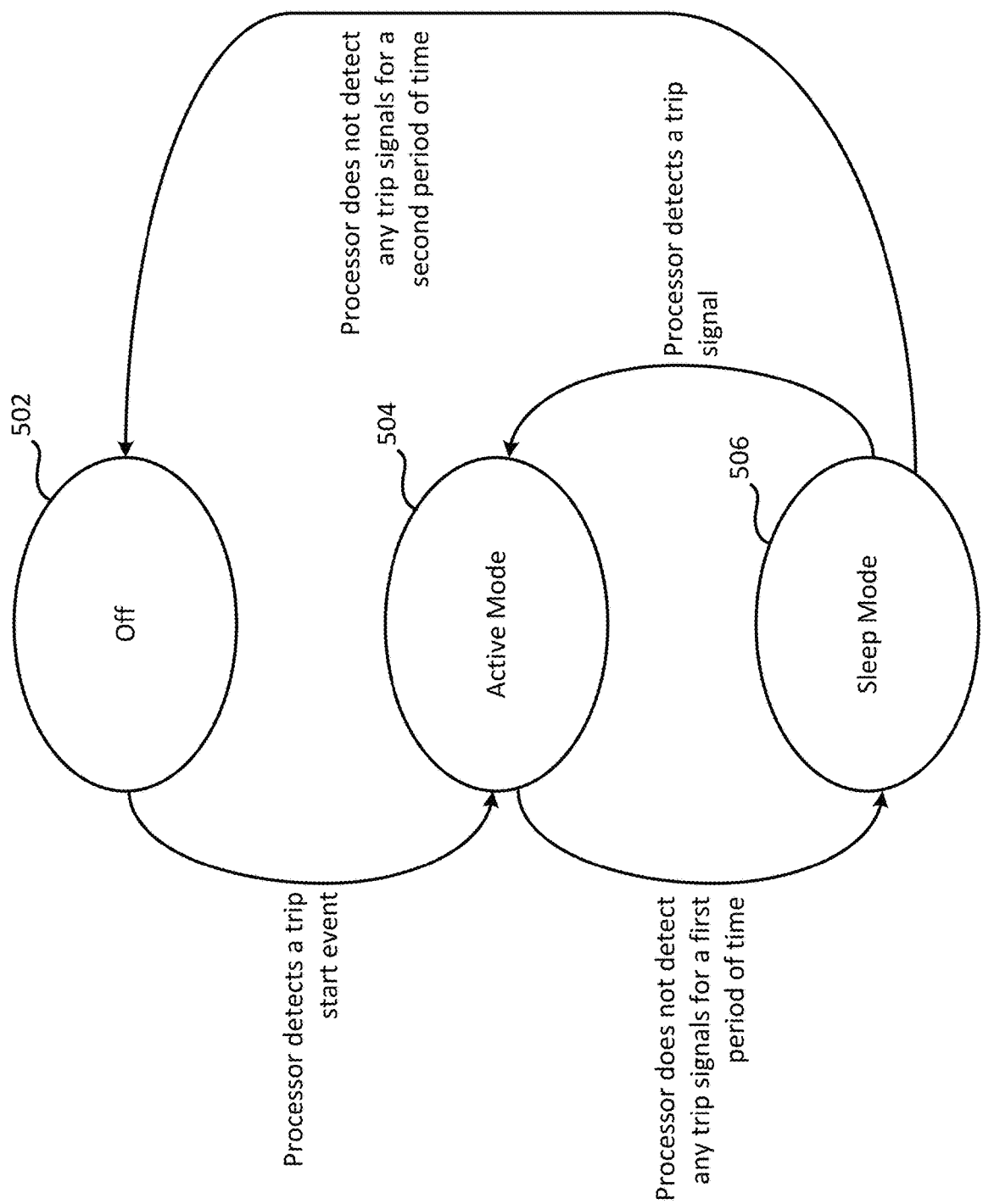
FIG. 5 shows an example of a process for switching among power modes of a GNSS, according to some aspects of the present disclosure.

While the processor 134 may implement the techniques described above to minimize its own power consumption, it can also implement additional techniques to reduce the power consumption of other components. One example of such a technique is shown in FIG. 5, which involves switching the GNSS 122 between various power modes according to a predefined scheme. As shown, the monitoring device 102 can maintain the GNSS 122 in an off mode 502 (powered off) by default. The processor 134 can detect a trip start event, for example based on accelerometer data as described above. In response to detecting the trip start event, the processor 134 can transmit a signal configured to turn on the GNSS 122. Based on the signal, the GNSS 122 enters the active mode 504 (e.g., a fully "on" mode). Thereafter, the processor 134 can continue to monitor accelerometer data from the accelerometer 118 and/or location data from the GNSS 122 for trip signals. If the processor 134 does not detect a trip signal for a first period of time (e.g., 10 seconds), the processor 134 can transmit a signal configured to cause the GNSS 122 to enter a sleep mode 506. This may reduce power consumption when the vehicle is stopped, for example at a stop sign or red light. In the sleep mode 506, the GNSS 122 can consume less power than in the active mode 504. After putting the GNSS 122 to sleep, the processor 134 can continue to monitor the accelerometer data and/or the location data for trip signals. If the processor 134 detects a trip signal within a second period of time (e.g., 5 minutes) after the GNSS 122 has entered the sleep mode 506, the processor 134 can transmit a signal to wake the GNSS 122 from the sleep mode 506 back to the active mode 504. This may allow the GNSS 122 to begin acquiring location data again, for example, once the vehicle has begun moving again because a traffic light has turned green. Conversely, if the processor 134 does not detect a trip signal within the second period of time, the processor 134 can transmit a signal to turn off the GNSS 122. This can revert the GNSS 122 back to the off mode 502. Using these techniques, the processor 134 can automatically switch the GNSS 122 between power modes (e.g., on, off, and sleep) based on the presence or absence of trip signals to help with power conservation.

Figure 6:
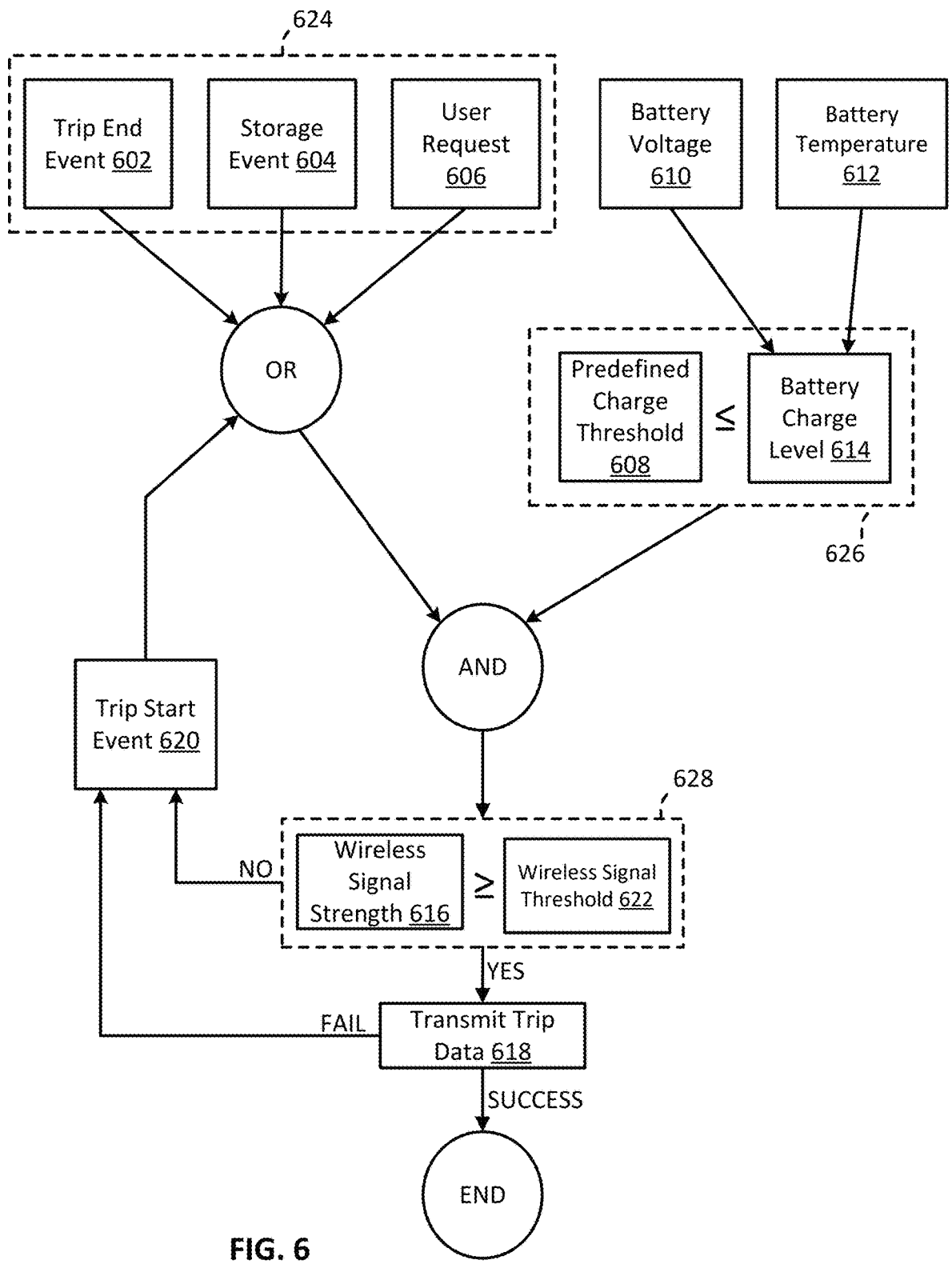
FIG. 6 shows an example of a process for transmitting trip data to a remote server system in response to detecting that one or more conditions are satisfied, according to some aspects of the present disclosure.

In addition to controlling usage of the GNSS 122 to reduce power consumption, the processor 134 can also control usage of the wireless transceiver unit 124. One example of such as process is shown in FIG. 6. As shown in FIG. 6, the processor 134 can attempt to transmit trip data 112 to a remote server system 114 only if one or more conditions 624-628 are met.

One example of such a condition 624 may be that a triggering event has occurred. Examples of the triggering event can include a trip end event 602, a storage event 604 such as the available storage space falling below a predefined space threshold, or a user request 606. The user request 606 may be communicated to the monitoring device 102 via a wireless signal from a user device (e.g., a Bluetooth signal from the user's smart phone), a user interaction with a user interface of the monitoring device 102, or in any other suitable manner.

Another example of such a condition 626 may be that the battery charge level 614 exceeds a predefined charge threshold 608. In some examples, the processor 134 can itself determine the battery charge level 614 based on the battery voltage 610 and the battery temperature 612, both of which can be received by the processor 134 from the battery control unit 130. Alternatively, the battery control unit 130 can determine the battery charge level 614 based on the battery voltage 610 and the battery temperature 612, and then communicate the battery charge level 614 to the processor 134. Either way, the processor 134 can determine the battery charge level 614 and compare it to predefined charge threshold 608.

Still another example of such a condition 628 may be that the wireless signal strength 616 meets or exceeds a predefined strength threshold 622. The processor 134 can assess the wireless signal strength 616, for example by communicating with the wireless transceiver unit 124. If the wireless signal strength meets or exceeds the predefined strength threshold 622, then it is more likely that a wireless transmission would succeed. If the wireless signal strength is below the predefined strength threshold 622, then it is more likely that a wireless transmission would fail. The processor 134 may additionally or alternatively evaluate other link conditions to determine a likelihood of transmission success. Poor link conditions may indicate that a wireless transmission is likely to fail.

The processor 134 can evaluate some or all of the above-mentioned conditions 624-628 in the sequence shown in FIG. 6 or in any other suitable sequence. If some or all of the above conditions 624-628 are satisfied—e.g., there is a triggering event, the battery charge level 614 is sufficient, and the wireless signal strength 616 is sufficient—the processor 134 can attempt to transmit the trip data 618 to the remote server system 114 using the wireless transceiver unit 124. Prior to transmission, the processor 134 can compress the trip data 112 using any suitable compression technique to reduce bandwidth consumption. In some examples, the trip data 112 can be transmitted in chunks to improve reliability. If the transmission succeeds, the process can end. Otherwise, the transmission can be queued for another attempt the next time a trip start event 620 is detected (e.g., at the beginning of the next trip), which can serve as another kind of triggering event, at which point the process can repeat. Using these techniques, trip data 112 can be transmitted in batches (e.g., at the end of trips). By only attempting to transmit trip data 112 when some or all of these conditions 624-628 are satisfied, power consumption can be reduced by decreasing usage of the wireless transceiver unit 124.

Figure 7:
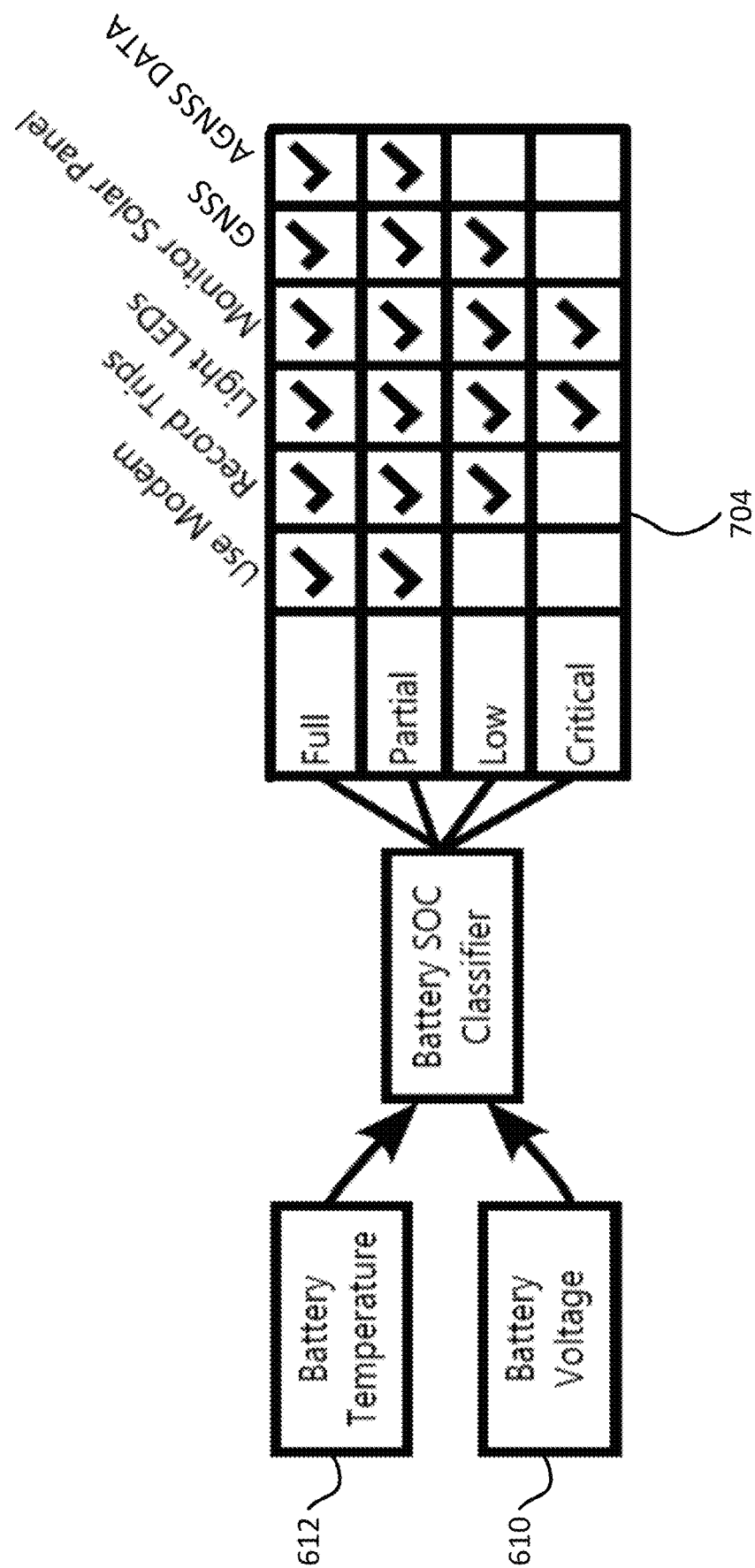
FIG. 7 shows an example of a process for enabling and disabling features based on battery charge level, according to some aspects of the present disclosure.

In some examples, the processor 134 may additionally or alternatively activate and/or deactivate certain features of the monitoring device 102 automatically based on the charge level of the battery. One example of this process is shown in FIG. 7, in which the processor 134 dynamically and progressively deactivates features over time as the battery depletes through various charge levels. As the available battery reserves diminish, the monitoring device 102 can progressively stop using its higher power features and depend solely on its lower power features (e.g., peripherals), in an effort to reduce power consumption.

As shown in FIG. 7, the processor 134 can execute a battery charge classifier 702 that can determine the charge level (e.g., State of Charge) of the battery 126 at a given point in time based on the battery voltage 610 and the battery temperature 612 at that point in time. After determining the charge level of the battery, the battery charge classifier 702 can classify the battery charge level into a corresponding category among a predefined set of charge categories. There can be any number of charge categories into which the battery charge level can be classified. Each of the charge categories can correspond to a respective range of battery charge levels. For example, a first charge category can correspond to a battery charge level range of 90%-100% full. This may be the "Full" category shown in FIG. 7. A second charge category can correspond to a battery charge level range of 70%-89% full. This may be the "Partial" category shown in FIG. 7. A third charge category can correspond to a battery charge level range of 40%-69% full. This may be the "Low" category shown in FIG. 7. A fourth charge category can correspond to a battery charge level range of 0%-39% full. This may be the "Critical" category shown in FIG. 7. Other amounts and arrangements of charge categories may be used in other examples.

Based on the charge category assigned to the battery charge level by the processor 134 at a given point in time, the processor 134 may activate/deactivate certain features (e.g., electronic components and/or functionality). For example, when the battery charge level corresponds to the first charge category, the processor 134 can automatically activate a first set of features. As shown in table 704, the first set of features can include usage of a modem or other part of the wireless transceiver unit 124, the recording of trip data, one or more UI components (e.g., LEDs or displays), the monitoring of the solar panel 128, usage of the GNSS 122, and the acquisition of assisted GNSS (A-GNSS) data. The A-GNSS data may be update data that can be downloaded from servers, for example, to help the GNSS 122 get fixes faster and with less power. When the battery charge level corresponds to the second charge category, the processor 134 can automatically activate a second set of features. The second set of features may be the same as or different from the first set of features. In some examples, the second set of features may include fewer features than the first set of features and, thus, the processor 134 may deactivate certain features to transition from the first set of features to the second set of features. As shown in table 704, the second set of features can also include usage of the modem, the recording of trip data, the one or more UI components, the monitoring of the solar panel 128, usage of the GNSS 122, and the acquisition of AGNSS data. When the battery charge level corresponds to the third charge category, the processor 134 can automatically activate a third set of features. The third set of features can include fewer features than the second set of features and, thus, the processor 134 may deactivate certain features to transition from the second set of features to the third set of features. As shown in table 704, the third set of features can include the recording of trip data, the UI components, the monitoring of the solar panel 128, and the GNSS 122. The third set of features can exclude usage of the modem and exclude the acquisition of AGNSS data. When the battery charge level corresponds to the fourth charge category, the processor 134 can automatically activate a fourth set of features. The fourth set of features can include fewer features than the third set of features and, thus, the processor 134 may deactivate certain features to transition from the third set of features to the fourth set of features. As shown in table 704, the fourth set of features can include the UI components and the monitoring of the solar panel 128. The fourth set of features can exclude usage of the modem, trip recording, usage of the GNSS 122, and the acquisition of AGNSS data. It will be appreciated that, in other examples, the processor 134 may selectively activate/deactivate more, fewer, or different features for more, fewer, or different charge categories than is shown in FIG. 7.

Figure 8:
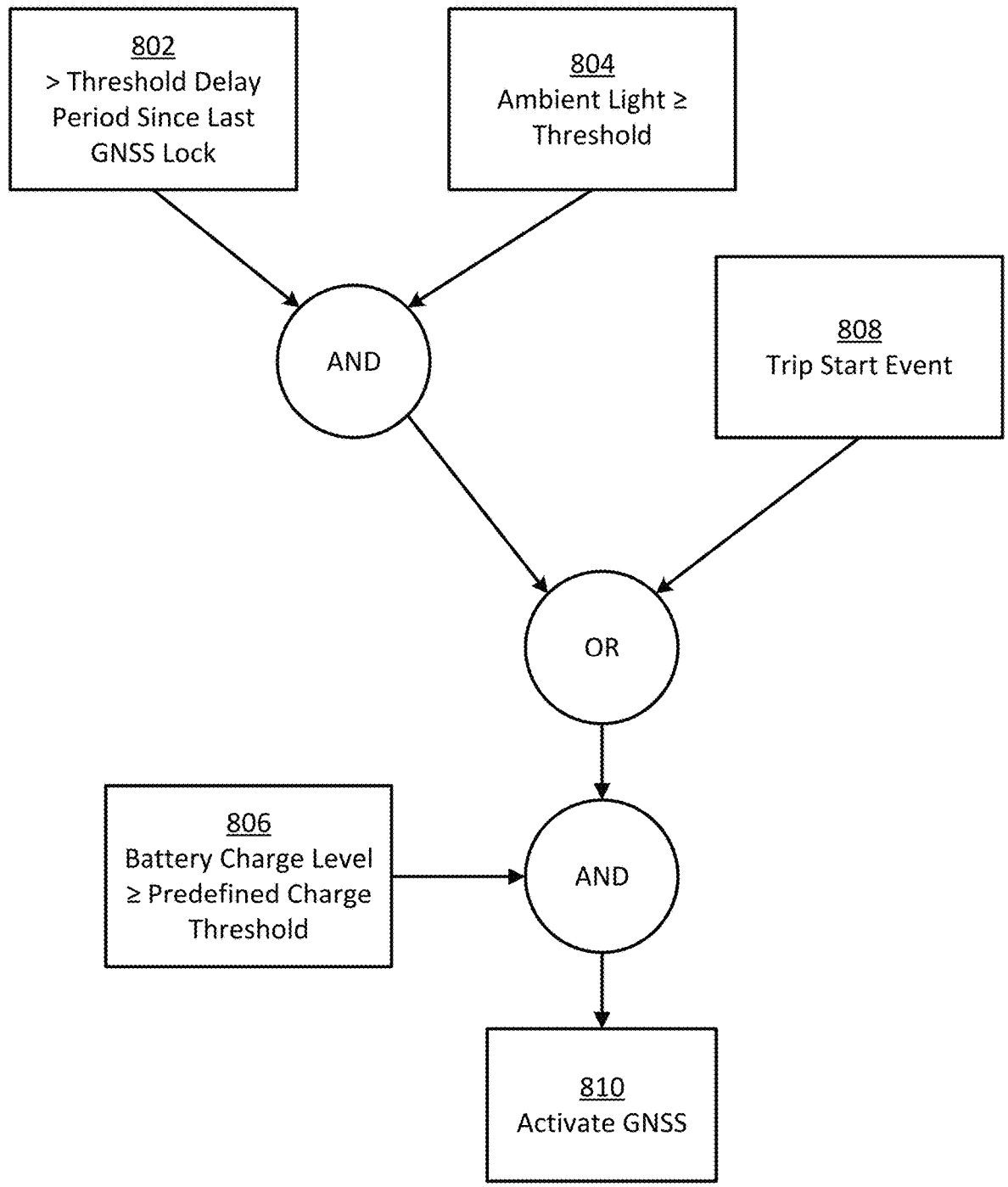
FIG. 8 shows an example of a process for activating a GNSS according to some aspects of the present disclosure.

In addition to performing operations designed to reduce power consumption, in some examples the monitoring device 102 can selectively activate the GNSS 122 according to an intelligent scheme to expedite the GNSS's 122 ability to lock its spatial location when a new trip begins. One example of this process is shown in FIG. 8. As shown, the processor 134 may activate the GNSS 122 in response to detecting that one or more conditions 802-808 are satisfied. One such condition may be a threshold delay condition 802 that involves determining whether a threshold delay period, such as 12 hours, has passed since the last GNSS 122 lock. Another such condition may be that an ambient light condition 804 that involves determining whether an ambient light level exceeds a predefined threshold. The processor 134 can determine the ambient light level using an ambient light sensor 138, which may be integrated into or separate from the solar panel 128. Still another such condition may be a battery charge condition 806 that involves determining whether the battery charge level meets or exceeds a predefined charge threshold. The predefined charge threshold may correspond to at least a sufficient amount of battery to operate the GNSS 122. The processor 134 can determine the battery charge level by communicating with the battery control unit 130, in some examples. Yet another such condition may be that a trip start condition 808 involving determining whether a new trip has started (e.g., detecting a trip start event).

If the processor 134 determines that one or more of the above conditions 802-808 are satisfied, the processor 134 may transmit a signal to activate the GNSS 122, as shown in block 810. At that point, the GNSS 122 can communicate with a satellite system 142 to derive its current spatial location and store corresponding location state data in its datastore 140. The location state data can indicate the current spatial location. Retrieving and storing the location state data may help expedite the GNSS 122 more quickly acquire a location lock the next time the GNSS 122 turns on. The GNSS 122 can be more likely to acquire a location lock quickly if it has recently acquired a location lock, giving it a good recent estimate of its position and time.

In some examples, the processor 134 may activate the GNSS 122 in response to detecting a certain sequence of the conditions 802-808 described above. For instance, the processor 134 may execute a first detection sequence when the monitoring device 102 is not in motion. The processor 134 may determine that the monitoring device 102 is not in motion based on a lack of trip signals for a predefined time period. In the first detection sequence, the processor 134 may first determine whether the threshold delay condition 802 and ambient light condition 804 are satisfied. If so, the processor 134 may next determine whether the battery charge condition 806 is satisfied. If so, the processor 134 may finally activate the GNSS 122. This sequence of decisions may help ensure that the GNSS 122 is activated relatively infrequently, and in particular when the GNSS 122 is likely to be able to achieve a location lock (to avoid wasting power on an unsuccessful attempt) and there is sufficient battery life to operate the GNSS 122. As another example, the processor 134 may execute a second detection sequence in response to detecting motion of the monitoring device 102. In the second detection sequence, the processor 134 can determine whether the trip start condition 808 is satisfied (e.g., a trip start event has been detected). If so, the processor 134 may next determine whether the battery charge condition 806 is satisfied. If so, the processor 134 may finally activate the GNSS 122. This sequence of decisions may help ensure that the GNSS 122 is activated when a trip begins (so that the GNSS 122 can be used to collect location data during the trip) and there is sufficient battery life to operate the GNSS 122. But other examples may involve more, fewer, different, or a different sequence of conditions than is shown in FIG. 8 to control activation of the GNSS 122.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

It is also understood that the examples and embodiments described herein are for illustrative purposes only and that various modifications or changes in light thereof will be suggested to persons skilled in the art and are to be included within the spirit and purview of this application and scope of the appended claims, which follow.

What is claimed is:

1. An apparatus comprising:
   an outer housing removably positionable in a passenger compartment of a vehicle, the outer housing including:
      a battery;
      a wireless transmitter coupled to the battery;
      an accelerometer coupled to the battery, the accelerometer being configured to transmit an interrupt signal in response to detecting an acceleration of the vehicle that exceeds a predefined acceleration threshold, wherein the predefined acceleration threshold is an acceleration value;
      a processor coupled to the battery, the accelerometer, and the wireless transmitter, wherein the processor is configured to:
         while in a hibernation mode, receive the interrupt signal from the accelerometer;
         in response to receiving the interrupt signal from the accelerometer, switch from the hibernation mode to a sleep mode;
         while in the sleep mode, detect a trip start event by analyzing one or more accelerometer values from the accelerometer, the trip start event being indicative of a start of a trip in the vehicle;
         in response to detecting the trip start event, switch from the sleep mode to an active mode; and
         while in the active mode, receive additional accelerometer values from the accelerometer and store the additional accelerometer values as trip data for subsequent transmission to a remote server system using the wireless transmitter; and
   a solar panel configured to generate electrical power to charge the battery.

2. The apparatus of claim 1, wherein the outer housing is configured to be coupled to a component of the passenger compartment of the vehicle, and wherein the solar panel is positioned on the outer housing to receive sunlight through a window of the vehicle for generating the electrical power.

3. The apparatus of claim 1, wherein the apparatus is not configured to make telephone calls.

4. The apparatus of claim 1, wherein the processor is further configured to:
   automatically switch from a running state to a paused state in-between receiving each pair of successive accelerometer values among the additional accelerometer values during the trip; and
   automatically switch from the paused state to the running state to receive each successive accelerometer value of the additional accelerometer values during the trip.

5. The apparatus of claim 1, wherein the outer housing further comprises a global navigation satellite system (GNSS) operable to generate location data indicating one or more geographical locations of the apparatus, and wherein the processor is further configured to:
   in response to detecting the trip start event, switch on the GNSS to an active mode;
   after switching on the GNSS to the active mode, receive the location data from the GNSS; and
   store the location data as part of the trip data for subsequent transmission to the remote server system using the wireless transmitter.

6. The apparatus of claim 5, wherein the processor is further configured to, after detecting the trip start event:
   determine that a trip signal has not been detected for at least a first period of time;
   in response to determining that the trip signal has not been detected for at least the first period of time, switch the GNSS from the active mode to a sleep mode;
   subsequent to switching the GNSS to the sleep mode, determine that the trip signal has not been detected for at least a second period of time following the first period of time; and
   in response to determine that the trip signal has not been detected for at least the second period of time, switch off the GNSS.

7. The apparatus of claim 5, further comprising an ambient light sensor coupled to the processor, wherein the processor is configured to:
   receive a sensor signal from the ambient light sensor indicating a level of ambient light in an environment associated with the apparatus;
   determine that the level of ambient light meets or exceeds a predefined threshold;
   determine that a threshold period of time has passed since a last GNSS lock; and
   in response to determining that the threshold period of time has passed and that the level of ambient light meets or exceeds the predefined threshold:
      turn on the GNSS, wherein the GNSS is configured to respond to being turned on by receiving current location data from a satellite system and updating a local database of the GNSS with the current location data; and
      after updating the local database, turn off the GNSS.

8. The apparatus of claim 1, wherein the processor is further configured to:
   while in the active mode, detect a trip end event by applying an algorithm to one or more accelerometer values from the accelerometer or location data from a GNSS, the algorithm being configured to distinguish between the trip end event and at least one other type of event, the trip end event indicating that the trip has ended; and
   in response to detecting the trip end event, transmit the trip data to the remote server system.

9. The apparatus of claim 1, wherein the processor is configured to:
   in response to detecting a triggering event, communicate with the wireless transmitter to determine whether a wireless signal strength meets or exceeds a predefined wireless signal threshold; and
   in response to detecting that the wireless signal strength is below the predefined wireless signal threshold, delay transmission of the additional accelerometer values to the remote server system until at least a predefined event is detected.

10. The apparatus of claim 9, wherein the triggering event includes another trip start event associated with a subsequent trip of the vehicle.

11. The apparatus of claim 1, wherein the processor is configured to dynamically disable features of the apparatus during the trip based on a charge level of the battery.

12. The apparatus of claim 11, wherein the processor is configured to:
determine the charge level of the battery;
classify the charge level into a particular category among a predefined set of categories; and
disable at least one feature of the apparatus based on the particular category into which the charge level was classified.

13. A method comprising:
transmitting, by an accelerometer of a device positioned in a passenger compartment of a vehicle, an interrupt signal to a processor of the device in response to detecting an acceleration of the vehicle that exceeds a predefined acceleration threshold, wherein the predefined acceleration threshold is an acceleration value;
receiving, by the processor while in a hibernation mode, the interrupt signal from the accelerometer;
switching, by the processor, from the hibernation mode to a sleep mode in response to receiving the interrupt signal from the accelerometer;
while in the sleep mode, detecting, by the processor, a trip start event by analyzing one or more accelerometer values from the accelerometer, the trip start event being indicative of a start of a trip in the vehicle;
switching, by the processor, from the sleep mode to an active mode in response to detecting the trip start event; and
while in the active mode, receiving, by the processor, additional accelerometer values from the accelerometer and store the additional accelerometer values as trip data for subsequent transmission to a remote server system using a wireless transmitter.

14. The method of claim 13, wherein the device is configured to be removably coupled to a windshield of the vehicle, and wherein a solar panel is positioned on the device to receive sunlight through the windshield for generating electrical power for a battery of the device.

15. The method of claim 13, further comprising:
automatically switching, by the processor, from a running state to a paused state in-between receiving each pair of successive accelerometer values among the additional accelerometer values during the trip; and
automatically switching, by the processor, from the paused state to the running state to receive each successive accelerometer value of the additional accelerometer values during the trip.

16. The method of claim 13, further comprising:
in response to detecting the trip start event, switching on a global navigation satellite system (GNSS) to an active mode;
after switching on the GNSS to the active mode, receiving location, speed, and direction data from the GNSS; and
storing the location, speed, and direction data as part of the trip data for subsequent transmission to the remote server system using the wireless transmitter.

17. The method of claim 16, further comprising, after detecting the trip start event:
determining that a trip signal has not been detected for at least a first period of time;
in response to determining that the trip signal has not been detected for at least the first period of time, switching the GNSS from the active mode to a sleep mode;
subsequent to switching the GNSS to the sleep mode, determining that the trip signal has not been detected for at least a second period of time following the first period of time; and
in response to determine that the trip signal has not been detected for at least the second period of time, switching off the GNSS.

18. The method of claim 16, further comprising:
receiving a sensor signal from an ambient light sensor indicating a level of ambient light in an environment associated with the device;
determining that the level of ambient light meets or exceeds a predefined threshold;
determining that a threshold period of time has passed since a last GNSS lock; and
in response to determining that the threshold period of time has passed and that the level of ambient light meets or exceeds the predefined threshold:
turning on the GNSS, wherein the GNSS is configured to respond to being turned on by receiving current location data from a satellite system and updating a local database of the GNSS with the current location data; and
after updating the local database, turning off the GNSS.

19. The method of claim 13, further comprising:
in response to detecting a triggering event, determining whether a wireless signal strength meets or exceeds a predefined wireless signal threshold; and
in response to detecting that the wireless signal strength is below the predefined wireless signal threshold, delaying transmission of the additional accelerometer values to the remote server system until another trip start event associated with another trip of the vehicle is detected.

20. The method of claim 13, further comprising:
determining a charge level of a battery of the device;
classifying the charge level into a particular category among a predefined set of charge categories; and
disabling at least one feature of the device based on the particular category into which the charge level was classified.

21. A non-transitory computer-readable medium comprising program code that is executable by a processor of a device that is positionable in a passenger compartment of a vehicle, the program code being executable by the processor to:
receive, while in a hibernation mode, an interrupt signal from an accelerometer of the device, the accelerometer being configured to generate the interrupt signal in response to detecting an acceleration of the vehicle that exceeds a predefined acceleration threshold, wherein the predefined acceleration threshold is an acceleration value;
switch from the hibernation mode to a sleep mode in response to receiving the interrupt signal from the accelerometer;
while in the sleep mode, detect a trip start event by analyzing one or more accelerometer values from the accelerometer, the trip start event being indicative of a start of a trip in the vehicle;
switch from the sleep mode to an active mode in response to detecting the trip start event; and
while in the active mode, receive additional accelerometer values from the accelerometer and store the additional accelerometer values as trip data for subsequent transmission to a remote server system using a wireless transmitter.

* * * * *